United States Patent [19]
Ruetz

[11] Patent Number: 5,253,985
[45] Date of Patent: Oct. 19, 1993

[54] EXHAUST GAS TURBOCHARGER HAVING ROTOR RUNNERS DISPOSED IN ROLLER BEARINGS

[75] Inventor: Georg Ruetz, Immenstaad, Fed. Rep. of Germany

[73] Assignee: MTU Motoren- und Turbinen-Union Friedrichshafen GmbH, Fed. Rep. of Germany

[21] Appl. No.: 28,601

[22] Filed: Mar. 8, 1993

Related U.S. Application Data

[63] Continuation of Ser. No. 713,065, Jun. 11, 1991.

[30] Foreign Application Priority Data

Jul. 4, 1990 [DE] Fed. Rep. of Germany ....... 4021325

[51] Int. Cl.⁵ ............................................. F04B 17/00
[52] U.S. Cl. ..................................... 417/407; 384/99; 384/473; 60/605.3
[58] Field of Search ............... 417/406, 407, 408, 409; 184/6.11; 60/605.3; 384/473, 99

[56] References Cited

U.S. PATENT DOCUMENTS

| 4,513,705 | 4/1985 | Evans | 123/196 S |
| 4,652,219 | 3/1987 | McEachern et al. | 417/407 |

FOREIGN PATENT DOCUMENTS

| 0272151 | 6/1988 | European Pat. Off. . |
| 3604625 | 8/1987 | Fed. Rep. of Germany . |
| WO 82/00865 | 3/1982 | PCT Int'l Appl. . |

Primary Examiner—Richard A. Bertsch
Assistant Examiner—William J. Wicker
Attorney, Agent, or Firm—Evenson, McKeown, Edwards & Lenahan

[57] ABSTRACT

An exhaust gas turbocharger having rotor runners disposed in roller bearings protects the roller bearings from shocks and vibrations by a pressure-oil-filled oil film damper. By a shut-off device arranged in the main lubricating oil duct, the lubricating oil supply of the roller bearings is shut off when the rotor runners are stopped. However, the pressure oil supply of the oil film damper remains operative so that the oil film damper retains its operability.

5 Claims, 1 Drawing Sheet

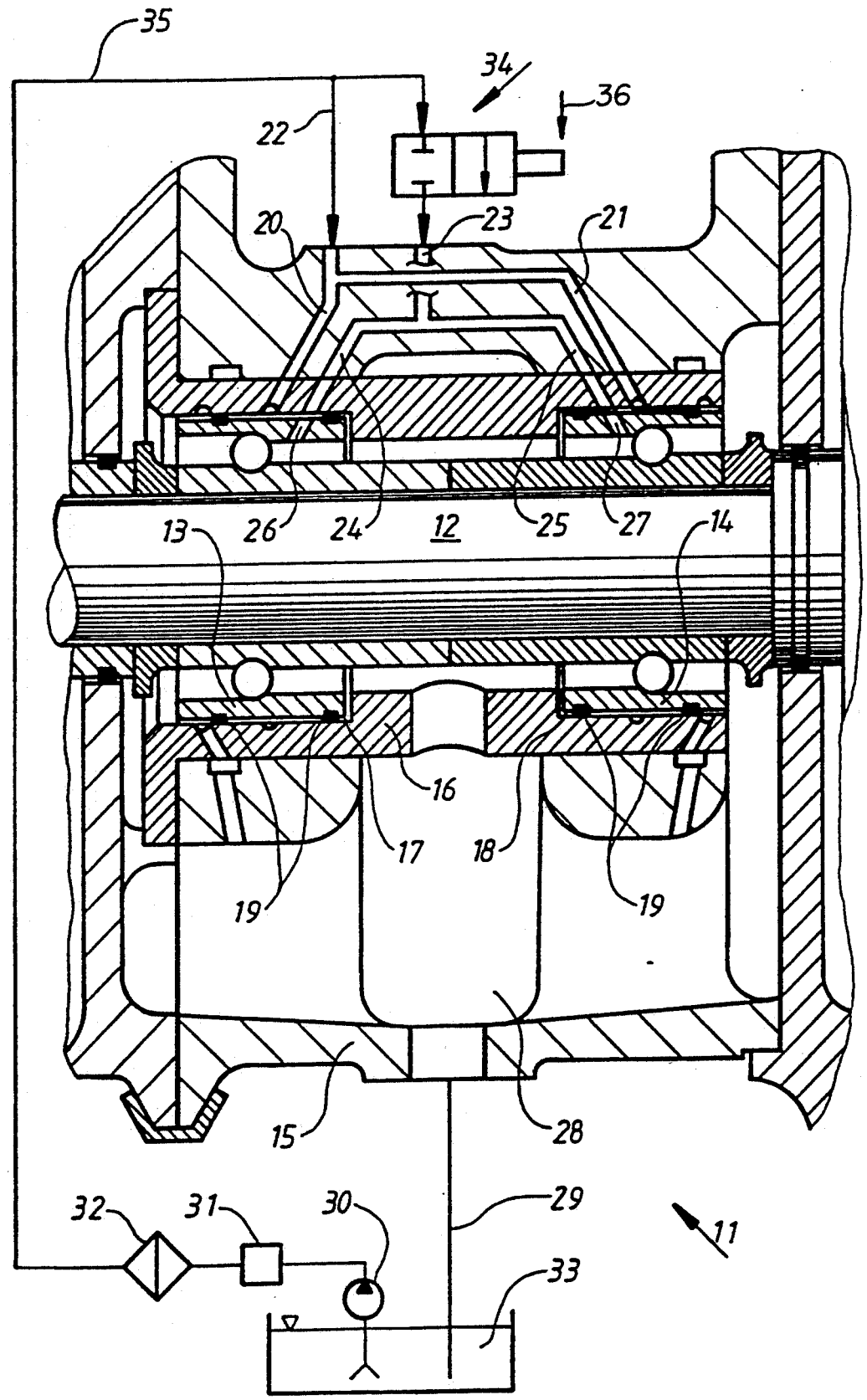

EXHAUST GAS TURBOCHARGER HAVING ROTOR RUNNERS DISPOSED IN ROLLER BEARINGS

This is a continuation of application Ser. No. 07/713,065, filed Jun. 11, 1991.

BACKGROUND AND SUMMARY OF THE INVENTION

The present invention relates to an exhaust gas turbocharger, having rotor runners disposed in roller bearings, a bearing support in which the roller bearings are supported and which is supplied with lubricating oil from an oil supply of the roller bearings via a main lubricating oil duct, and a space that is concentrically arranged with respect to the roller bearings, the space representing an oil film damping gap which is pressure-fed from the lubricating oil supply of the roller bearings.

An oil film damper reduces the vibrations and shocks affecting the rotor runners of an exhaust gas turbocharger. However, the oil film damper is effective only when it is continuously fed with pressure oil. The reason is that, when the oil supply is interrupted, the oil filling of the oil film damping gap is evacuated because of the pumping effect resulting from the vibrations, and the oil film damper therefore becomes ineffective.

The roller bearings of exhaust gas turbochargers are particularly sensitive to vibrations when the rotor runners do not rotate, and the lubricating oil supply therefore is not in effect during this time. Such an operating condition occurs, for example, for an exhaust gas turbocharger of an internal-combustion engine which is part of a multi-engine system and is inoperative while vibrations and shocks are transmitted by the other operative internal-combustion engines. The same applies, in the disconnected condition, to an exhaust gas turbocharger, which can be connected and disconnected, and whose lubricating oil supply is also switched off, while the assigned internal-combustion engine is operative. Because the oil film damper is inoperable, contact corrosion will then occur between the roller bodies and the moving path of the roller bearing. Therefore, when the operation of the exhaust gas turbocharger is started, damage may occur at the roller bearing that may endanger the operation.

On the other hand, there is the risk that oil may enter into the air-carrying or gas-carrying spaces during a lubricating oil supply to the exhaust gas turbocharger which continues to operate while the rotor runners are inoperative, unless the efficiency of the seals is ensured also during the stoppage of the rotor runners by additional measures and devices. If oil were to enter, lubricating oil puddles would form in the gas-carrying spaces which, when the exhaust gas turbocharger, which was switched off, restarts, react uncontrollably with the gas flows. The leakage oil which is situated in the exhaust gas system would result in an oil fire because of an ignition at the hot exhaust gas. The leakage oil penetrated into the charge air system would be pulled along by the charge air current and would result in an overheating in the cylinders. Both would constitute extreme risks to operation.

An object of the present invention is to ensure, for an exhaust gas turbocharger which is disposed in a roller bearing and is exposed to shocks and vibrations in the inoperative position, the pressure oil supply to the oil film damping gap when the rotor runners do not rotate or rotate slowly and to avoid an entering of oil into gas-carrying spaces.

This and other objects are achieved by the present invention which provides an exhaust gas turbocharger, having rotor runners disposed in roller bearings, a bearing support in which the roller bearings are supported and which is supplied with lubricating oil from an oil supply of the roller bearings via a main lubricating oil duct, and a space that is concentrically arranged with respect to the roller bearings, the space representing an oil film damping gap which is pressure-fed from the lubricating oil supply of the roller bearings. An oil duct branches off the main lubricating oil duct for the pressure feeding of the oil film damping gap and a controllable shut-off device is coupled in the main lubricating oil duct between the oil supply and the roller bearings and which controls the pressure oil lubrication of the roller bearings.

Some of the principal advantages of the present invention are that, when the rotor runners of the exhaust gas turbocharger are stopped, the operability of the oil film damping is maintained when the pressure oil lubrication of the roller bearings is inoperative. A modification of the sealing device between the oil-carrying and gas-carrying spaces is not required for their efficiency when the rotor rollers are stopped. The exclusive oil supply of the oil film damping gap, when the rotor runners of the exhaust gas turbocharger are stopped, uses up only a small amount of oil. When the pressure oil lubrication is inoperative, oil, which emerges via the lubricating oil bores into the outer rings of the bearings from the oil film damper, results in a drip lubrication for the roller bearings. The danger of oil overflowing into the charge-air-carrying and exhaust-gas-carrying spaces of the exhaust gas turbocharger will no longer exist because of the small amount of oil emerging from the oil film damping gap.

Other objects, advantages and novel features of the present invention will become apparent from the following detailed description of the invention when considered in conjunction with the accompanying drawings.

BRIEF DESCRIPTION OF THE DRAWINGS

The single drawing FIGURE illustrates a partially shown exhaust gas turbocharger constructed in accordance with an embodiment of the present invention.

DETAILED DESCRIPTION OF THE DRAWINGS

An only partially shown exhaust gas turbocharger 11 has a rotor runner shaft 12 which is disposed in roller bearings 13, 14. A lubricating oil delivery device comprising a pump 30, a pressure regulator 31 and a filter 32 supplies the exhaust gas turbocharger 11 from a lubricating-oil reservoir 33 by way of a main lubricating oil duct 35 with lubricating oil. The lubricating oil delivery device may be constructed as an autonomous unit or may be the lubricating oil system of the internal-combustion engine assigned to the exhaust gas turbocharger 11.

A bearing support sleeve 16 inserted into the housing 15 of the exhaust gas turbocharger 11 is used for receiving the roller bearings 13, 14. There is one concentric space respectively between the outer ring of each roller bearing 13, 14 and the bearing support sleeve 16 forming an oil film damping gap 17, 18 which is axially sealed off by oil retainer rings 19. Via oil ducts 20, 21, 22, the oil damping gaps 17, 18 are pressure-fed from the main lubricating oil duct 35. The lubricating oil supply to the roller bearings 13, 14 takes place via lubricating oil ducts 23, 24, 25 and lubricating oil bores 26, 27 in the outer rings of the roller bearings 13, 14, the oil film damping gaps 17, 18 being crossed by the lubricating oil ducts. Between the outer rings of the roller bearings 13, 14 and the bearing support sleeve 16, devices are arranged which are not shown and which force the required installation of the outer rings in the correct position.

Between the main lubricating oil duct 35 and the lubricating oil duct 23 used for the roller bearing lubrication, a controllable blocking device (or "shut-off valve") 34 is arranged by which the lubricating oil supply of the roller bearings 13, 14 can be interrupted.

Oil flowing out of the roller bearings 13, 14 and the oil film damping gaps 17, 18 collects in the relief space 28 and, by way of the return flow line 29, flows back into the lubricating oil reservoir 33. When the rotor runners of the exhaust gas turbocharger 11 are stopped, the pump 30 remains operative, and therefore a lubricating oil pressure exists in the main lubricating oil duct 35. The oil film damping gaps 17, 18 are then pressure-fed via the oil ducts 20, 21, 22 from the main lubricating oil duct 35, and are therefore fully operable. At the same time, the shut-off valve 34 is in its shut-off position so that the lubricating oil supply of the roller bearings is inoperative. The oil, which in this operating condition flows out of the oil film damping gaps 17, 18 via the lubricating oil bores 26, 27 forms a dripping lubrication for the roller bearings 13, 14. This ensures the initial lubrication of the roller bearings 13, 14 at the time of the restart of the exhaust gas turbocharger 11.

A signal which characterizes the starting of the operation of the exhaust gas turbocharger 11 switches the shut-off device 34 into the flow-through condition, and the pressure oil lubrication of the roller bearings 13, 14 will start. The signal 36 for the start of the operation is derived from an operating parameter of the exhaust gas turbocharger 11 or of the assigned internal-combustion engine.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An exhaust gas turbocharger, having rotor runners disposed in roller bearings, a bearing support in which the roller bearings are supported and which are supplied with lubricating oil from an oil supply via a main lubricating oil duct, and an oil film damping gap pressure-fed from the lubricating oil supply, wherein a separate oil duct branches off the main lubricating oil duct for the pressure feeding of the oil film damping gap, and a shut-off device controllable in response to a control signal to interrupt the oil supply to the roller bearings is coupled in the main lubricating oil duct downstream of the oil duct branch off from the main lubricating oil duct and between the lubricating oil supply and the roller bearings and which shut-off device controls the pressure oil lubricating of the roller bearings.

2. An exhaust gas turbocharger according to claim 1, the turbocharger further having a bearing support sleeve in the bearing support, with one oil film damping gap respectively which is arranged in the radial direction between the bearing support sleeve and each outer diameter of the roller bearings and in the axial direction between two outer sealing rings.

3. An exhaust gas turbocharger according to claim 1, wherein the shut-off device is controllable by a signal characterizing the start of operation of the exhaust gas turbocharger.

4. An exhaust gas turbocharger comprising:
   rotor runners disposed in roller bearings;
   a bearing support in which the roller bearings are supported;
   an oil supply;
   a main lubricating oil duct coupled between the oil supply and the roller bearings;
   an oil film damping gap arranged directly on an outer circumference of the roller bearings;
   an oil duct that branches off at a branch point from the main lubricating oil duct and is coupled to the oil film damping gap to supply oil from the oil supply to the oil film damping gap;
   a shut-off device controllable in response to a control signal coupled in the main lubricating oil duct between the branch point and the roller bearings, the controllable shut-off device controllably interrupting the oil supply to the roller bearings via the main lubricating oil duct;
   a pump coupled between the oil supply and the branch point, said pump supplying pressure-fed oil to the roller bearings via the main lubricating oil duct and the oil duct and being operative when said rotor runners are operative and inoperative such that the oil duct supplies oil to the oil film damping gap when the oil supply to the roller bearings via the main lubricating oil duct is interrupted by the shut-off device.

5. An exhaust gas turbocharger, having rotor runners disposed in roller bearings, a bearing support in which the roller bearings are supported and which are supplied with lubricating oil from an oil supply via a main lubricating oil duct, and an oil film damping gap arranged directly on an outer circumference of the roller bearings, said oil film damping gap being pressure-fed from the lubricating oil supply, wherein an oil duct branches off the main lubricating oil duct for the pressure feeding of the oil film damping gap, and a shut-off device controllable in response to a control signal to interrupt the oil supply is coupled in the main lubricating oil duct downstream of the oil duct branch off from the main lubricating oil duct and between the lubricating oil supply and the roller bearings and which shut-off device controls the pressure oil lubricating of the roller bearings, wherein the oil duct supplies oil to the oil film damping gap when the oil supply to the roller bearings via the main lubricating oil duct is interrupted by the shut-off device.

* * * * *